United States Patent [19]

Kramer et al.

[11] Patent Number: 4,568,874
[45] Date of Patent: Feb. 4, 1986

[54] RF ADMITTANCE APPARATUS AND METHOD FOR MONITORING THE CONTENTS OF A PIPE

[75] Inventors: L. Jonathan Kramer, Warminster; Frederick L. Maltby, Jenkintown, both of Pa.

[73] Assignee: Drexelbrook Controls, Inc., Horsham, Pa.

[21] Appl. No.: 467,464

[22] Filed: Feb. 17, 1983

[51] Int. Cl.[4] .................. G01F 23/26; G01R 27/26
[52] U.S. Cl. .................. 324/61 R; 73/304 C; 361/284
[58] Field of Search .......... 73/304 R, 304 C; 324/61 P; 174/35 R; 340/620

[56] References Cited

U.S. PATENT DOCUMENTS

| | | | |
|---|---|---|---|
| 2,754,478 | 7/1956 | Goldsmith | 324/61 R |
| 2,978,638 | 4/1961 | Wing et al. | 324/61 R |
| 2,998,559 | 8/1961 | Smith | 361/284 |
| 3,376,746 | 4/1968 | Roberts | 73/304 C |
| 3,706,980 | 12/1972 | Maltby | 340/507 |
| 3,746,975 | 7/1973 | Maltby | 324/65 R |
| 3,781,672 | 12/1973 | Maltby et al. | 73/304 C |
| 3,879,644 | 4/1975 | Maltby | 340/61 P |
| 4,146,834 | 3/1979 | Maltby et al. | 324/60 R |

*Primary Examiner*—Daniel M. Yasich
*Attorney, Agent, or Firm*—Woodcock Washburn Kurtz Mackiewicz & Norris

[57] ABSTRACT

A hollow probe which is adapted to respond to the degree to which a pipe is filled with fluid includes the use of a tubular conductive probe measuring electrode and a pair of tubular conductive guard electrodes axially displaced from the probe electrode. The tubular electrodes are hollow and are adapted to form a fluid conducting portion of the fluid-carrying pipe. The probe electrode and guard electrodes are separated by solid insulation. The guard electrodes are separated from sections of the pipe on either side of the hollow probe by solid insulation. The guard electrodes are exposed to the contents of the pipe and, by driving the guard electrodes at substantially the same potential as the probe electrode, the adverse effects of a coating of fluid adhering to the probe are substantially eliminated. Also disclosed is RF admittance-responsive circuitry which responds to the electrical characteristics of the contents of the probe and pipe, and which is adapted to drive the guard electrodes at substantially the measuring potential applied to the probe measuring electrode. By capacitively coupling the admittance-responsive circuitry to the contents of the probe, a substantial improvement in the ability of the system to tolerate conductive coating of the probe is achieved.

11 Claims, 17 Drawing Figures

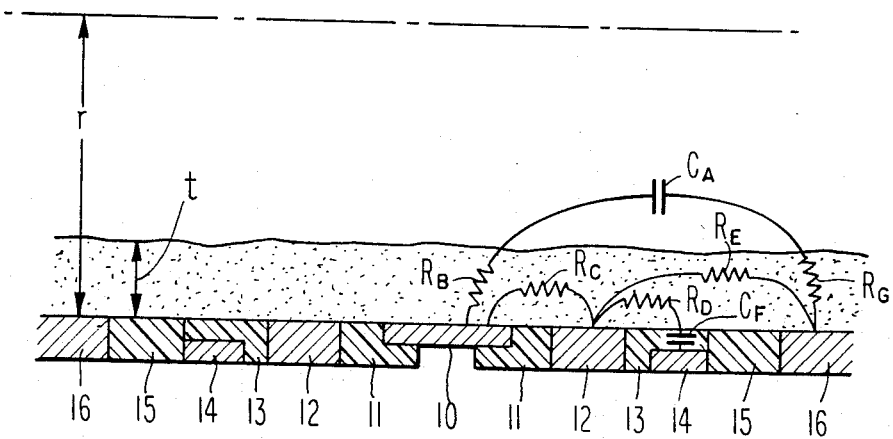
_Fig. 6_
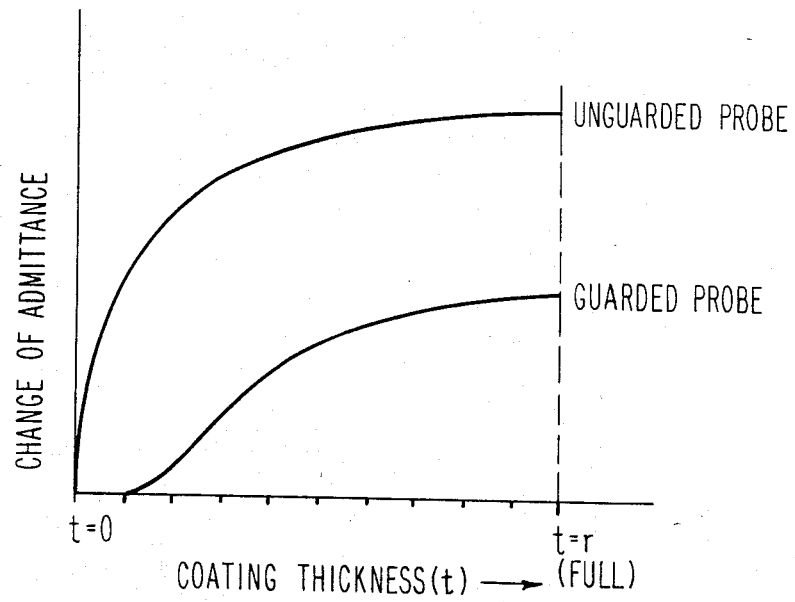
_Fig. 7_

RF ADMITTANCE APPARATUS AND METHOD FOR MONITORING THE CONTENTS OF A PIPE

BACKGROUND OF THE INVENTION

This invention relates to an improved method and apparatus for RF admittance measurement of the degree to which a pipe is filled with fluid.

Pumps of many types will be damaged if they are operated without fluid in them. To protect the expensive pumps, it is desirable to monitor the pump inlet lines and to shut off the pump motor if the inlet line is not filled with fluid.

Monitoring attempts have included RF admittance responding sensors comprising a tubular probe electrode adapted to form a portion of the pump inlet line. The admittance between the probe electrode and the adjacent sections of grounded inlet line varies with the degree to which the inlet line is filled with fluid and with the electrical characteristics of any fluid present.

The fluid being pumped may at one time be an insulator of low dielectric constant, and at another time be extremely conductive for instance when a caustic solution is used to clean the residue of a previously pumped organic fluid.

The fluid being pumped may also be extremely viscous, and leave substantial coatings on the inside of the sensor when the inlet line is not filled. These fluid characteristics have caused the prior art admittance sensing schemes to give unreliable indications of whether a pump inlet line is fluid filled, because there are no known admittance-responsive circuits which can reliably detect a capacitance change on the order of one picofarad due to filling a pipe with an insulator having a low dielectric constant and which can also ignore a resistance on the order of one ohm due to a conductive coating in an otherwise empty sensor.

In U.S. Pats. No. 3,706,980-Maltby and U.S. Pat. No. 3,879,644-Maltby, both assigned to the assignee of this invention, systems are disclosed for mitigating the effects of conductive coatings on admittance-responding probes. This is accomplished by providing a guard electrode which is exposed to the material being measured and driven at substantially the same potential as the probe electrode so as to maintain an accumulated coating at substantially the same potential as the probe electrode and thereby reduces the effect of such a coating on a capacitance measurement. The probes described in these patents are well suited to detecting the level of materials in tanks or bins, but are inadequate for detecting whether the inlet line of a pump is filled. Were the elongated structure of FIG. 1 of these patents utilized to detect fluid in a pipe, either the rod-shaped probe electrode would protrude into and thus interfere with the flow of fluid in the pipe, or if mounted in a recess in the wall of the pipe so as to not protrude into the fluid flow, would be subject to increased coating problems and greatly reduced sensitivity to the presence of material in the pipe itself. Were a plate-like structure as in FIGS. 3 or 5 of U.S. Pat. No. 3,879,644 utilized to detect whether a pipe were filled with fluid, such structures would have to be curved to conform to the pipe radius in order to prevent intrusion into the fluid flow or mounted in a recess in which a substantial amount of material could adhere and foul the probe when the pipe was not filled. Such a curved probe would be very expensive to produce, and in order to reliably detect that a pipe was filled, an array of them would have to be positioned around the pipe, further increasing the cost. Finally, it would be difficult to manufacture the probes depicted in the aforementioned patents in sizes small enough for use with pump inlet pipes, which pipes may be as small as one inch diameter.

Known admittance-responsive circuits for use with guarded probes are also inadequate for use with filled-pipe probes due to the range of impedances presented by the probe, as mentioned above. A conductive coating which would present a resistance on the order of one ohm between the probe electrode and ground of the prior art unguarded tubular probes would present resistances on the same order to the probe electrode and the guard electrodes, and between the guard electrodes and ground. Guard sources which can maintain their output at substantially the same voltage as the probe electrode with a one ohm load do not exist in available admittance-measuring systems. Given such a guard source, known methods of connecting the guard source to the guard electrodes would not permit the guard electrodes to be at the same voltage as the probe due to the inductive impedance of the connection. Even if the guard electrodes themselves could be maintained at probe potential, the portion of a coating over the guard electrodes not in contact with the electrodes will be at a reduced potential due to the coating resistance, and this reduced-potential portion will couple a sufficient fraction of the ohm-range probe electrode to guard electrode coating resistance into the admittance measuring circuit to cause erroneous indications in known admittance measuring circuits. The present invention is directed at surmounting these and other shortcomings of the prior art.

SUMMARY OF THE INVENTION

It is an object of this invention to provide a method and apparatus for detecting the degree to which a fluid-carrying pipe is filled.

It is also an object of this invention to provide such an apparatus which may be used with fluids having a wide range of electrical characteristics.

It is also an object of this invention to provide a probe which does not adversely affect and is not adversely affected by the flow of fluid in a pipe.

It is a further object to provide a probe and measuring circuit wherein the measurement is not adversely affected by coatings which may adhere to the probe.

It is also an object of this invention to provide a measuring system wherein the measuring circuitry may be mounted remote from the heat and vibration which may be present in the pipe being monitored, without deleterious effects on the measurement.

It is a further object of this invention to provide a measuring system wherein the admittance-responsive circuitry may be pre-calibrated to accurately detect the degree to which any size pipe is filled with any fluid.

It is also an object of this invention to provide a probe which is easily installed in the pipe to be monitored, and which is usable with fluids having a wide range of temperatures and pressures.

It is finally a general object of this invention to provide such a measuring apparatus which is simple, rugged, reliable and inexpensive.

In one embodiment of the invention, a probe for monitoring the contents of a pipe comprises hollow tubular conductive probe measuring electrode means and a pair of hollow tubular guard electrode means axially displaced from and insulated by solid insulation from the probe measuring electrode. The inside diameter of the probe measuring electrode, the guard electrodes and the solid insulation may be made the same as the inside diameter of the pipe to be monitored so that the probe may replace a portion of the monitored pipe without altering the flow characteristics of the pipe. The probe measuring electrode is capacitively coupled to an AC voltage source, either by a dielectric coating over the inner surface of the electrode or by a discrete capacitor element in series with the measuring electrode and a conductor connecting the electrode to the voltage source.

In a preferred embodiment of the probe of this invention, the probe also comprises an additional tubular guard electrode coaxial with, insulated from and surrounding the probe measuring electrode, and grounded electrodes axially displaced from the guard electrodes, which grounded electrodes are insulatd from the guard electrodes and from the contents of the pipe. The preferred embodiment of the probe measuring also comprises a capacitor connected between the probe electrode and the terminal by which the probe is connected to the admittance measuring circuitry.

In a preferred embodiment of this invention, the admittance measuring circuitry comprises a transformer-coupled RF bridge circuit. A winding of the bridge transformer provides a low-voltage low-impedance source of alternating voltage which is connected to the guard electrodes of the probe so as to maintain the guard electrodes and any coating present on them at substantially the same potential as the probe, thus alleviating the adverse effects of a coating in the probe. In a particularly preferred embodiment of the invention, the potential used as a bridge reference is not the guard voltage source, but rather is the potential at the guard electrodes themselves, returned to the RF bridge via a different conductor than that which connects the guard source to the guard electrodes. By this method, a potential drop in the inductive impedance of the conductor connecting the guard source to the guard electrodes due to the presence of a conductive coating in the sensor is not injected into the measured signal.

Further in accordance with the invention, the low-amplitude bridge AC error signal between the admittance-responding probe terminal and the bridge reference is amplified by a stable, high-gain amplifier and applied to a phase-sensitive detector primarily responsive to the capacitive portion of bridge unbalance, the output of said detector being indicative of the degree to which the probe is filled with fluid.

The foregoing and other objects, features, and advantages of the invention will become more apparent from the following description, drawings, and claims.

BRIEF DESCRIPTION OF THE DRAWINGS

FIG. 6 schematically illustrates the admittances associated with a conductive coating on the probe of FIG. 4;

FIG. 7 illustrates the admittance versus coating thickness characteristic of the probe of FIG. 4;

DETAILED DESCRIPTION OF THE PREFERRED EMBODIMENTS

Figure 1:
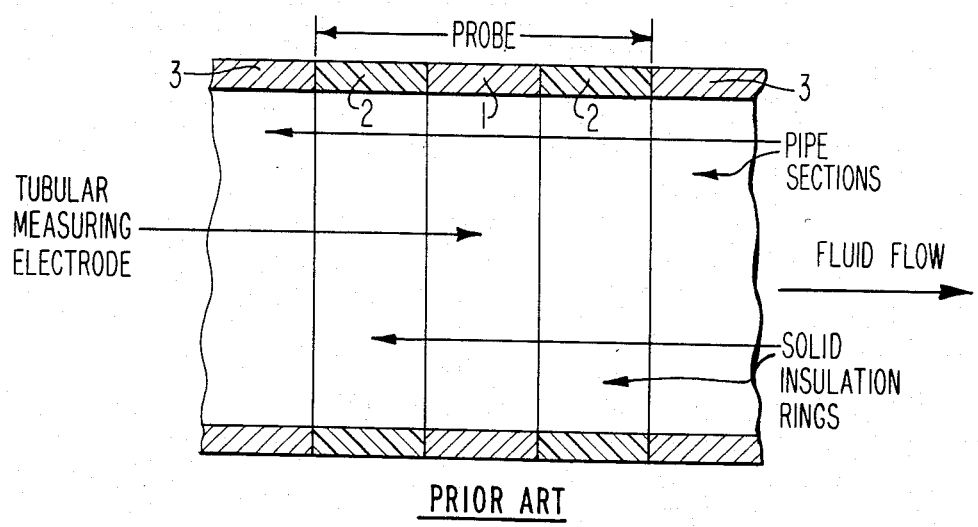
FIG. 1 is a diagrammatic cross-sectional view of the electrode structure of a prior art hollow tubular probe mounted between pipe sections.
Figure 2:
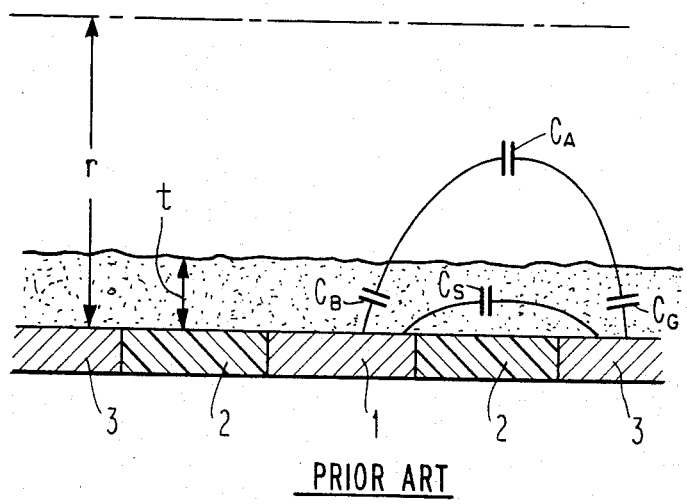
FIG. 2 schematically illustrates the admittances associated with a coating on the inner surfaces of the prior art probe of FIG. 1.
Figure 2A:
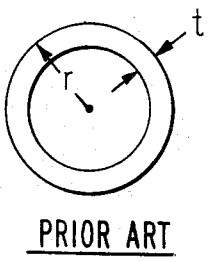
FIG. 2a is a sectional view of the diagrammatic structure of FIG. 1.

The prior art probe of FIG. 1 and FIG. 2a consists of a hollow tubular conductive probe measuring electrode 1 and hollow tubular insulators 2 having generally the same inside diameter as the adjacent sections 3 of the pipe into which the probe is placed for monitoring. The contents of the probe and pipe together with the geometry of the probe determine the admittance between the probe measuring electrode and ground, which admittance is measured by external circuitry (not shown).

FIG. 2 shows a cross-section of the prior art probe of FIG. 1 with a coating adhering to the interior of the probe such as may be left after the bulk of a viscous material has drained away. With an insulating coating as shown, the admittance between probe and ground is capacitive and consists of the capacitance $C_S$ through the coating in parallel with the air capacitance $C_A$ coupled to the electrode 10 through series capacitances $C_B$ and $C_G$. Because the probe is symmetric, capacitances are only shown on one half of the probe. If the coating thickness t is zero (pipe is empty), the capacitance is solely the air capacitance $C_A$ and is determined by probe geometry. If the coating thickness t is equal to the pipe radius r (pipe is full), then $C_A$ will be zero and the capacitance will be entirely the "coating" capacitance $C_S$ and equal to $C_A$ multiplied by the material dielectric constant. In between these extremes, the admittance changes in the manner shown in FIG. 3.

Figure 3:
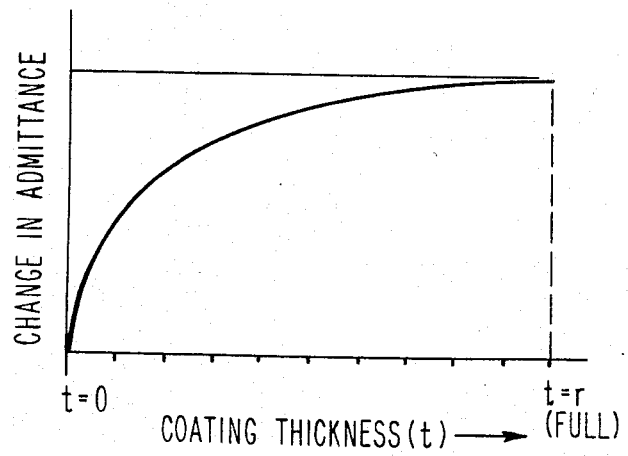
FIG. 3 illustrates the admittance versus coating thickness characteristic of the prior art probe of FIG. 1.

For very thin coatings as shown in FIG. 3, a given change in coating thickness will give a large change in capacitance because the path length from probe measuring electrode to ground through the coating is short and the area of the capacitor formed by the material is large because the material is near the periphery of the pipe. Also, any component of capacitance through air changes very little because $C_B$ and $C_G$ are large, and $C_A$ changes little because its path length changes little. The opposite is true for very thick coatings approaching the pipe radius. Under these circumstances a given change in coating thickness produces little change in capacitance because the path length from probe to ground through the added thickness is long and the area of the added thickness is small, being near the center of the pipe. Also, $C_B$ and $C_G$ are small due to the large path through the coating and $C_A$ is small because there is little air in the pipe. Thus, as the curve in FIG. 3 shows, the prior art probe is most sensitive to a coating in the pipe and least sensitive for detection that the pipe is full. This is precisely the opposite of what is desired. Moreover, the situation is greatly exacerbated if the coating is conductive. Such a coating will appear as in FIG. 2 if the capacitances $C_B$, $C_S$, and $C_G$ are replaced with resistances. The shape of the admittance response of FIG. 3 applies to the conductive case, but the magnitude of admittance presented with typical conductive fluids is many orders of magnitude larger than the admittance of typical dielectric fluids. For a given probe geometry the ratio of conductive admittance to capacitive admittance is $G/wC = g/wKEo$ where g is conductivity, K is dielectric constant, w is the radian frequency of admittance measurement, and Eo is the permittivity of free space. If a pipe may contain material having a K of 2 at one time and a material having a g of 100,000 microhms/cm at another time, and measurement is made at a typical frequency of 600,000 radians/second, the admittance ratio is on the order of 1 million. Thus, an extremely thin coating of conductive material will present the same admittance as a pipe full of insulating material, causing known admittance-responsive circuits to erroneously indicate a full-pipe condition when in fact the pipe is virtually empty.

Figure 4:
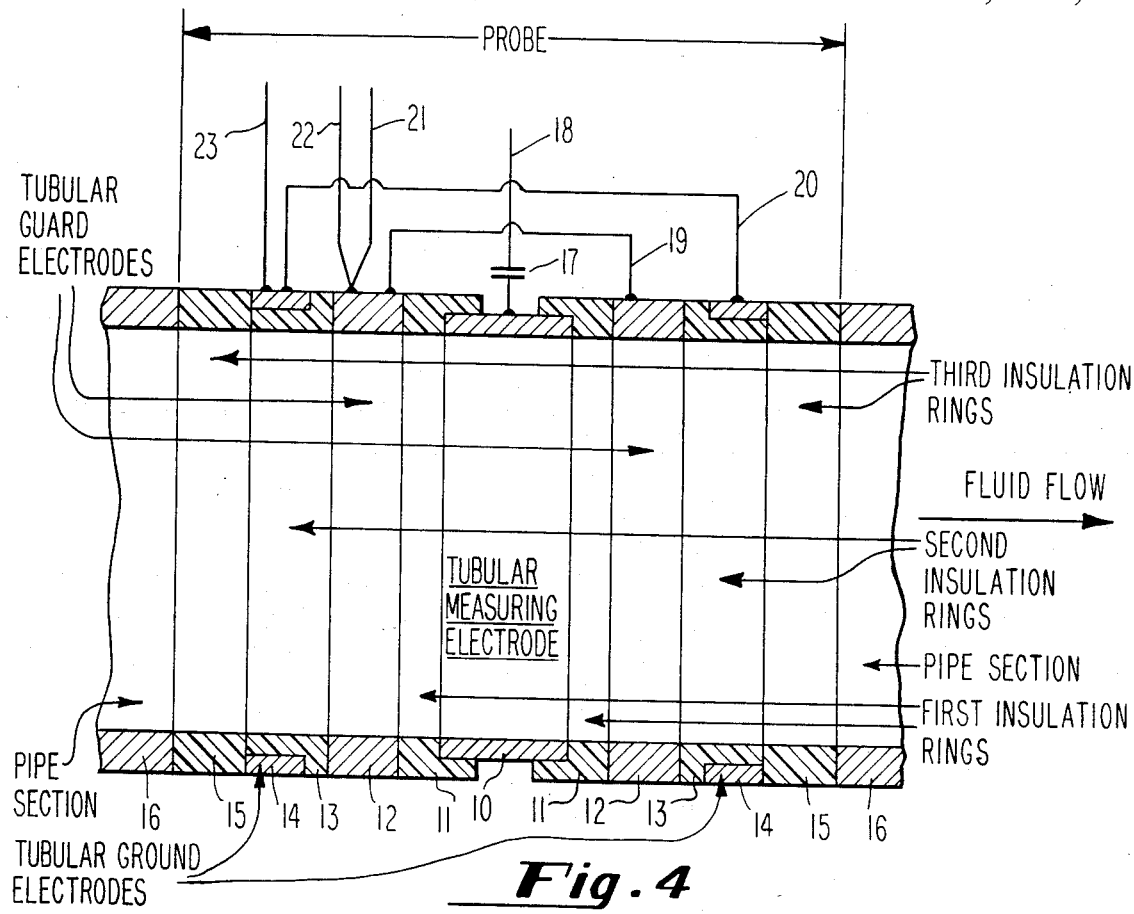
FIG. 4 is a diagrammatic cross-sectional view of the electrode structure of the preferred embodiment of the hollow, tubular probe of this invention.
Figure 5:
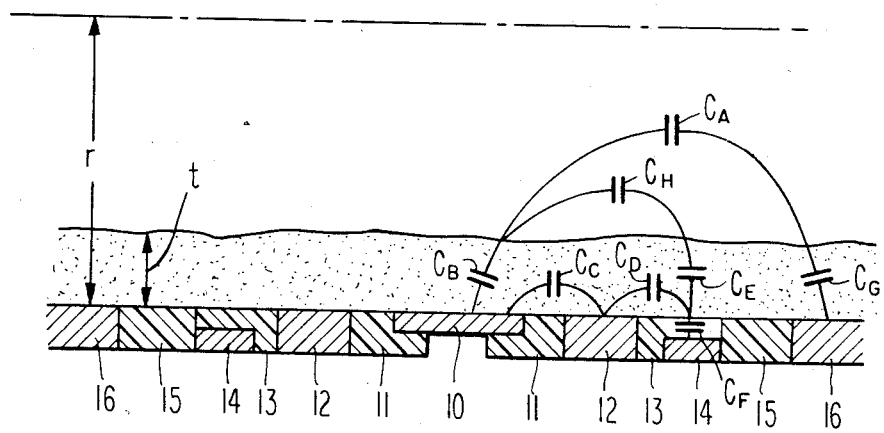
FIG. 5 schematically illustrates the admittances associated with an insulating coating on the inner surfaces of the probe of FIG. 4.
Figure 5A:
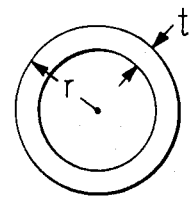
FIG. 5a is a sectional view of the structure of FIG. 4.

These problems of the prior art are overcome by the probe structure shown in cross-section in FIG. 4 and FIG. 5a. This probe is mounted between sections 16 of a pipe for carrying an insulative or conductive fluid and contains hollow tubular members including a hollow conductive probe measuring electrode 10, a pair of hollow, tubular solid insulation members 11 adjacent to the probe measuring electrode on either side thereof, a pair of hollow, tubular guard electrodes 12 adjacent to insulation 11 and exposed to the contents of the pipe, but axially displaced from the probe measuring electrode 10, and a pair of hollow, tubular solid insulation members 15 between the guard electrodes and the portions 16 of grounded pipe to be monitored on either side of the probe. In a preferred embodiment, the probe also includes includes tubular ground electrodes 14 insulated from contact with the contents of the probe by solid insulation 13, and includes a capacitance in series with the admittance measurement circuitry shown here as capacitance 17. The guard electrode 12 are connected to each other by conductor 19, as are ground electrodes 14 by conductor 20. Connections to external admittance-measuring circuitry are made via conductor 23 from the ground electrodes, conductors 21 and 22 from the guard electrodes, and conductor 18 electrode from the probe measuring electrode. As shown, the internal surfaces of the electrodes and insulators of the probe may be made with the same diameter as the inside diameter of the monitored pipe, thus preventing the probe from adversely affecting or being adversely affected by the fluid flow.

FIG. 5 shows a cross-section of the probe of FIG. 4 with the admittances presented by an insulating coating in the probe and pipe. Because the structure is symmetric, admittances are shown for one-half of the structure. The admittance through the coating from probe measuring electrode to ground is broken up by the guard electrode into capacitance $C_C$ and $C_D$. Because the guard electrode is maintained substantially at the measuring potential, negligible current flows in $C_c$ and it thus has little effect on the measurement. Because the current flow in the shield electrode is not measured, $C_d$ has little effect on the measurement. Thus for thin coatings, where the material over the guard electrode is well coupled to the guard potential, current does not flow in the coating and the measured admittance consists of air capacitances $C_A$ and $C_H$ coupled through the coating by capacitances $C_b$ over the probe measuring electrode, $C_g$ over the grounded pipe, and $C_E$ in series with $C_F$ over the insulated ground electrode. As described with respect to the prior art probe, these air capacitances change slowly with changes in coating thickness or thin coatings. This is shown in FIG. 7 in the region of the guarded curve near the origin.

In accordance with one important aspect of the invention, the ground electrode 14 provides a short path length for the air capacitance $C_H$, which greatly increases the sensitivity of the probe for insulating materials. The insulation 13 above the ground electrode 14 will typically have a much larger capacitance $C_F$ than $C_H$, allowing substantially all of the capacitance between the probe measuring electrode 10 and ground electrode 14 to be sensed. However, the RF impedance of capacitance $C_F$ will generally be quite large compared to the resistance provided by a conductive coating, so the senstivity increase gained by inclusion of ground electrode 14 is not gained at the expense of reduced performance with conductive materials.

Although the guard electrode 12 can maintain thin coatings at guard potential, the surface of a sufficiently thick coating will not be well-coupled to the guard electrode and a capacitance (like capacitance $C_S$ in FIG. 2) apears from probe measuring electrode to ground which bypasses the guard electrode 12 and thus is measured. This generally occurs when the thickness of the coating exceeds one-quarter of the axial length of the guard electrode 12. This is shown in FIG. 7 in the rapidly rising portion of the guard curve.

As the thickness t of the coating approaches the pipe radius r, the sensitivity decreases as was the case for an unguarded probe, due to the long path length and reduced area of an added increment of coating.

The behavior described above is summarized and compared with that of an unguarded probe in the graphs of FIG. 7. The guarded probe curve shows that such a probe is unresponsive to coatings and gives maximum sensitivity only after a substantial portion of the probe has been filled. The unguarded probe curve shows that it responds maximally to a coating, and is insensitive after only a small portion of the pipe has been filled. The difference in sensitivity to the full-pipe condition is due to the fact that the guarded probe will always create a portion of the probe contents which is not detected. This difference is not a significant drawback.

FIG. 6 shows a cross-section of the probe of FIG. 4 with the admittances presented by a conductive coating. The probe is symmetric, so admittances are only shown on half of it. Because the guard electrode 12 is driven at substantially the measuring potential, no current flows in the resistance $R_c$ between the probe measuring electrode 10 and the guard electrode 12, so $R_c$ has little effect on measured admittance. Because current flow in the guard electrode 12 is not measured, resistance $R_E$ between the guard electrode 12 and the grounded pipe 16 has little effect on the measurement, provided the source of guard voltage can effectively support the guard-to-ground load. Because this load may be extremely heavy, on the order of 1 ohm with expected coatings of conductive materials, effort should be made to keep this load as light as possible. In this regard, the probe of this invention has a long path for the direct resistance $R_E$ between the probe measuring electrode 10 and the grounded pipe 16, while the resistive path through $R_D$ is rendered of high impedance by the capacitive isolation $C_F$ of the insulator 13.

As was the case for insulating coatings, for thin coatings the admittance presented will slowly rise, as in the portion of the guarded probe curve near the origin of FIG. 7. However, for sufficiently thick coatings the guard electrode 12 will not be able to maintain the surface of the coating at the potential of the guard electrode, and a resistance will appear directly from the probe measuring electrode 10 to the grounded pipe 16 which bypasses the guard electrode. In the case of a conductive coating, the magnitude of the admittance thus appearing may be many orders of magnitude greater than in the insulating case. Thus, a resistance of 1 ohm may be presented to a measuring circuit which is sensitive to 1 picofarad.

In accordance with this invention, to avoid the adverse effects of such a resistance on the measuring circuit, a capacitance 17 shown in FIG. 4 is placed in series with the probe measuring circuit. This capacitance 17 may take the form of a layer of solid insulation placed over the probe measuring electrode 10 so as to isolate it from direct contact with the contents of the probe. In a preferred embodiment, capacitance 17 is a discrete capacitor included in the probe structure. Capacitor 17 acts to limit the admittance which can be presented to the measuring circuit to the admittance of this capacitor. The admittance of capacitor 17 is desirably large compared to the admittance expected when the the probe is filled with an insulating material of low dielectric constant, and small compared to the admittance expected when the probe is filled with conductive materials of high conductivity. The resulting curve of admittance versus coating thickness will have the shape of the guarded-probe curve of FIG. 7, but the maximum admittance will be that of capacitor 17. Thus, for conductive materials as well as insulating materials, the probe of this invention is generally insensitive to coatings in the probe and gives its greatest response when the probe is substantially filled.

Figure 12A:
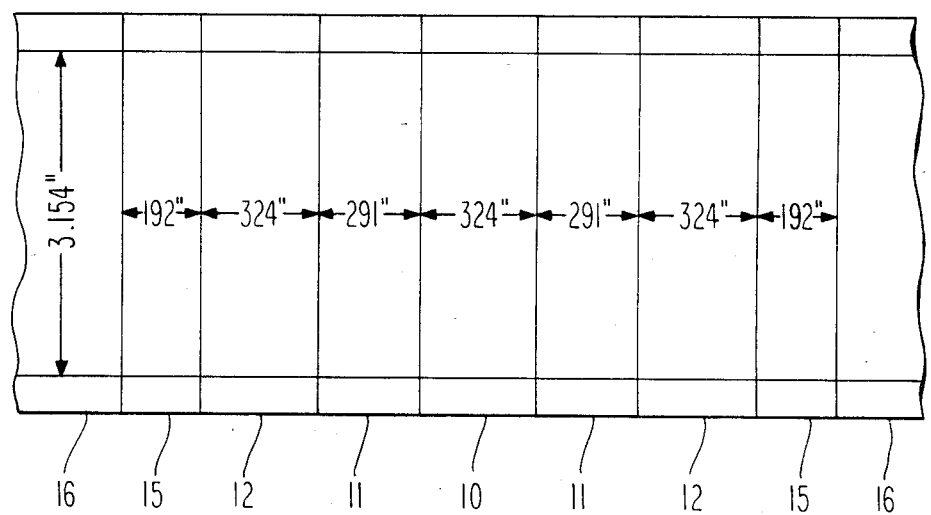
FIG. 12A is a cross-sectional view of a particular probe constructed in accordance with this invention.
Figure 12B:
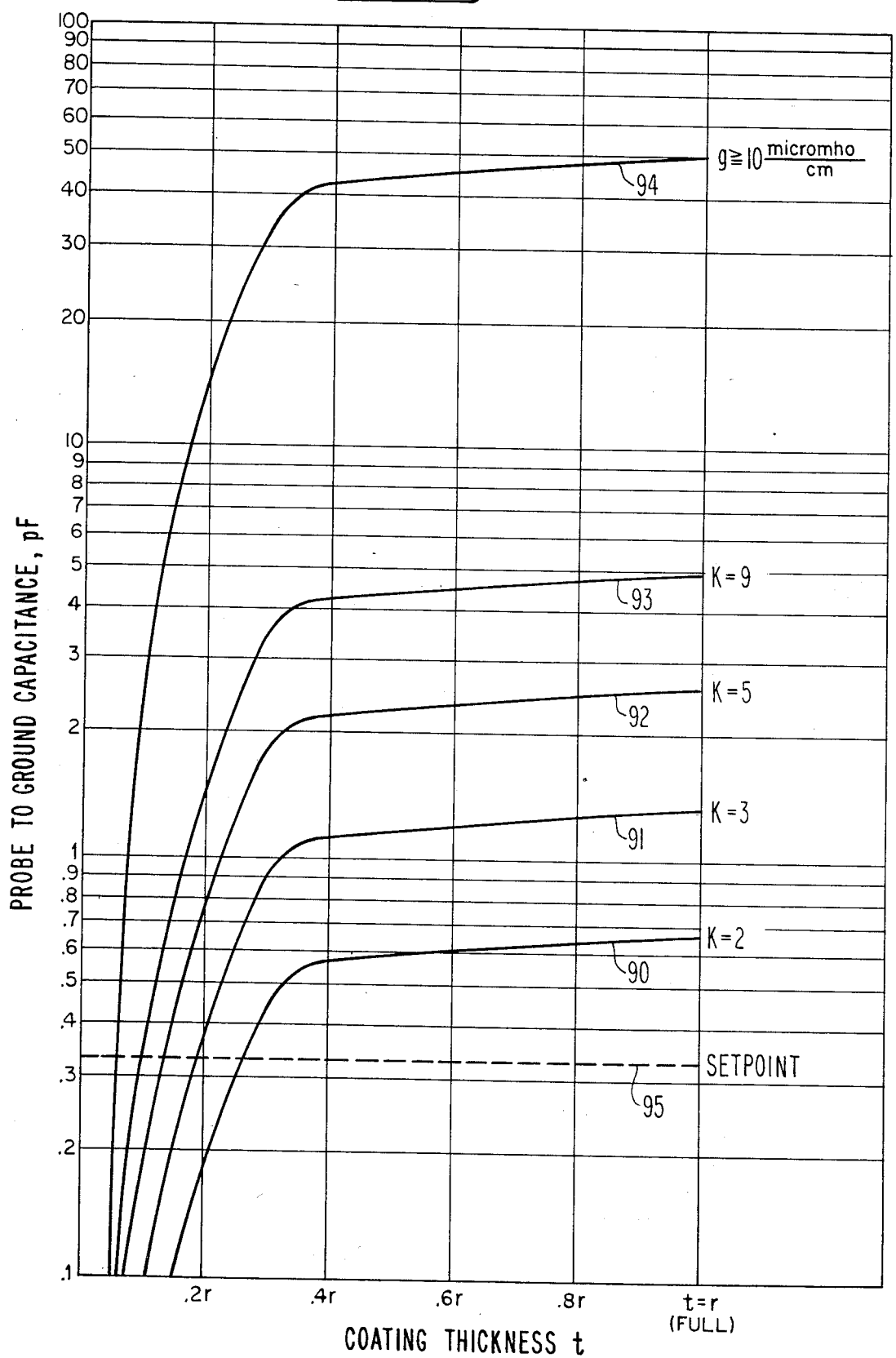
FIG. 12B illustrates the capacitance versus coating thickness characteristic of the probe of FIG. 12A.

The graph of FIG. 12B illustrates how an admittance measuring circuit may be precalibrated to reliably detect fluids having a wide range of electrical characteristics in a probe of this invention. The curves in this graph were generated from experimental data on a probe having the dimensions shown in FIG. 12A. This probe does not contain the insulated ground electrodes 14 included in the probe of FIG. 4. The curves of FIG. 12B illustrate the capacitance response versus coating thickness for dielectric materials of $K=2$, 3, 5 and 9, and for conducting materials having a conductivity in excess of 10 microohms per centimenter, with a probe series capacitor 17 of 50 pF. The vertical axis is logarithmic so that all curves may be conveniently displayed. As was previously suggested, the dielectric curves 90 through 93 have generally the same shape and are an increasing function of dielectric constant K. The conductive curve 94 has generally the same shape as the dielectric curves and has an upper limit of 50 pF due to the action of series capacitor 17. The response of the probe to conductive materials will be generally independent of conductivy for materials having a conductivity g greater than about 10 micromhos per centimeter, provided that the guard source impedance at the guard electrodes 12 is sufficiently low. As was previously mentioned, a coating having a thickness of less than one quarter of the axial length of the guard electrodes will contribute virtually nothing to the measured capacitance. Thus the curves 92, 93 and 94 show a vertical asymptote at a coating thickness of one quarter of the axial length of the guard electrodes 12 which for the probe of FIG. 12B is at around 0.05 of the pipe radius. In practice virtually all fluids to be measured have dielectric constants greater than 2 or conductivities greater than 10 micromhos per centimeter, so curve 90 represents a practical lower limit of probe response that will be encountered. To reliably detect a meterial of $K=2$ having this response, the admittance rsponding circuitry is desirably calibrated to respond to a capacitance one-half as large as that provided by a full pipe. This capacitance calibration level is shown by setpoint curve 95. At this setpoint, the admittance responding circuitry will detect the full pipe condition for conductive materials and for dielectric materials with a K of 2 or more, and will be able to ignore coating thicknesses ranging from 0.06 to 0.26 of the pipe radius for these materials. The latter indicates that the probe of this invention has converted the aforementioned roughly million-to-one admittance ratio to a roughly four-to-one variation in the amount of pipe filling to which the admittance measuring circuitry will respond. Such a variation is quite acceptable for protecting a pump from running dry. Thus, when calibrated as described above, a system in accordance with this invention may be pre-calibrated to acurrately monitor the contents of a pipe regardless of the electrical properties of the contents.

For any given pipe size and probe axial length, a figure of merit can be defined as to the thickness of highly conductive material which will produce an output equal to one half of the output produced by a pipe filled with a material having a dielectric constant of 2. The probe of FIG. 12A has a figure of merit of 0.095 inches, indicating that this thickness of conductive coating will be effectively ignored by this probe.

Figures 8, 8A:
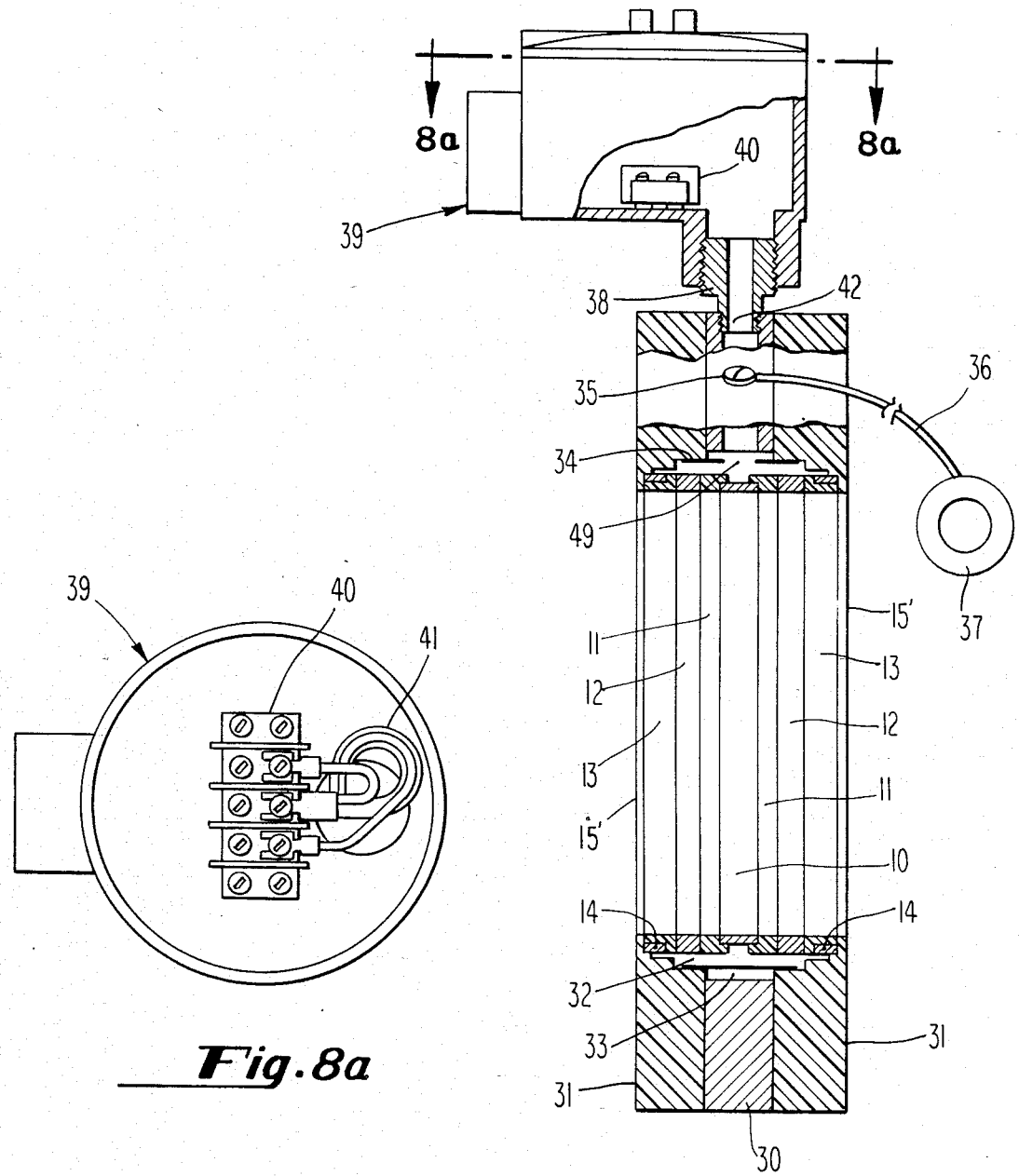
FIG. 8 is a detached sectional view of the probe of this invention which may be easily installed in a pipe.
FIG. 8a is a sectional view of the probe of FIG. 8 taken along line a—a of FIG. 8.
Figure 8B:
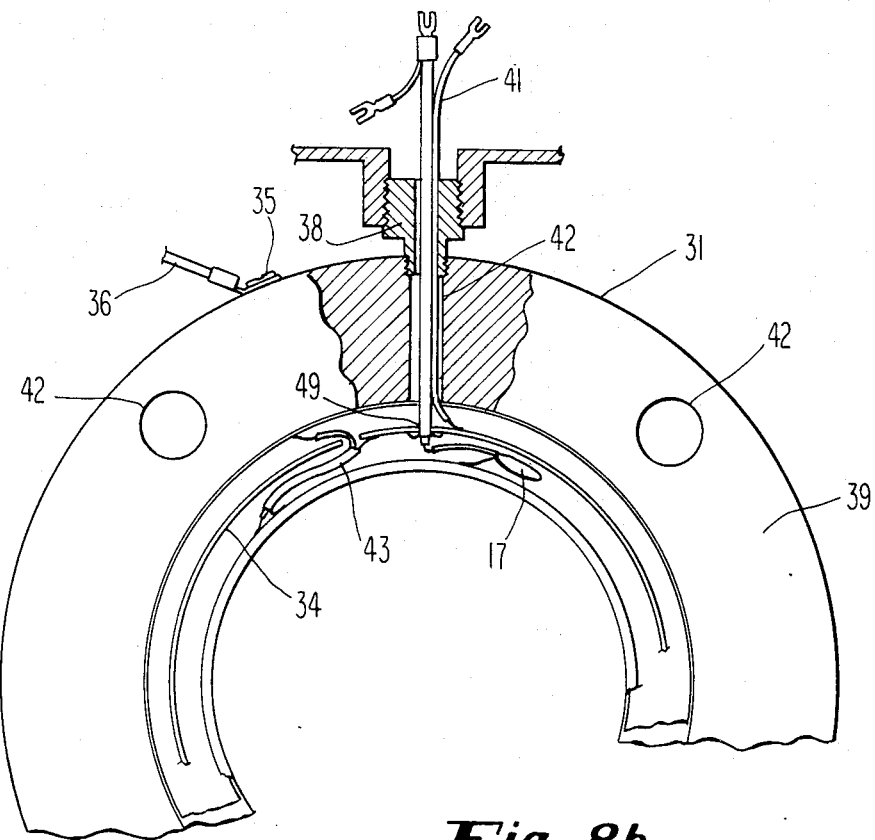
FIG. 8b is a another sectional view of the probe of FIG. 8.

In accordance with an important aspect of this invention, FIGS. 8, 8a and 8b show a probe configuration which may be easily introduced into the pipe to be monitored. A metal flange 30 is sandwiched between a pair of insulating flanges 31. A central inner circumferential recess in these sandwiched flanges receives the electrodes and insulators 10 through 14 of FIG. 4, with inner circumferential portions 15' of the insulating flanges 31 serving as insulators like insulators 15 of FIG. 4. Such a flanged structure, with holes 42, is easily bolted between a pair of flanges terminating the ends of sections of a pipe to be monitored, creating a pressure-tight assembly. The metal flange 30 is adapted to be grounded to the piping via washer 37 which may be placed under the head of mounting bolts, conductor 36, and screw 35. To avoid measuring the capacitance to the grounded metal flange 30, a tubular electrode 34 driven at guard potential separates the probe electrode 10 from the flange 30.

Conduit 39 containing terminal block 40 forms a junction box for connecting the external admittance measuring circuitry to the probe, and is connected to flange 30 by coupling 38. A 3-conductor assembly 41 as shown in FIG. 8b passes through an aperture in coupling 38 and through aperture 42 in flange 31 to the interior of the probe. Here, two of the conductors, corresponding to 21 and 22 of FIG. 4, are attached to the guard electrode 34. The third conductor, corresponding to 18 of FIG. 4, passes through an opening 49 in guard electrode 34 where it is connected to probe measuring electrode 10 through series capacitor 17. Connection is made to the guard electrodes 12 from the guard electrode 34 by the braid of coaxial cable 43. This connection means, corresponding to 23 of FIG. 4, screens the ground connection from the flange 30 to the ground electrodes 14 which is made by the center wire of coaxial cable 43.

Air gaps in the probe structure such as 32 and 33 surrounding the guard electrode 34 and the apertures in the flange 30 and coupling 38 are desirably filled by potting with a plastic material such as epoxy. This results in a rugged structure capable of withstanding substantial internal pressure. By suitable choice of materials for the electrodes exposed to the contents of the pipe, the probe may be made to withstand high temperatures and corrosive materials.

Figure 9:
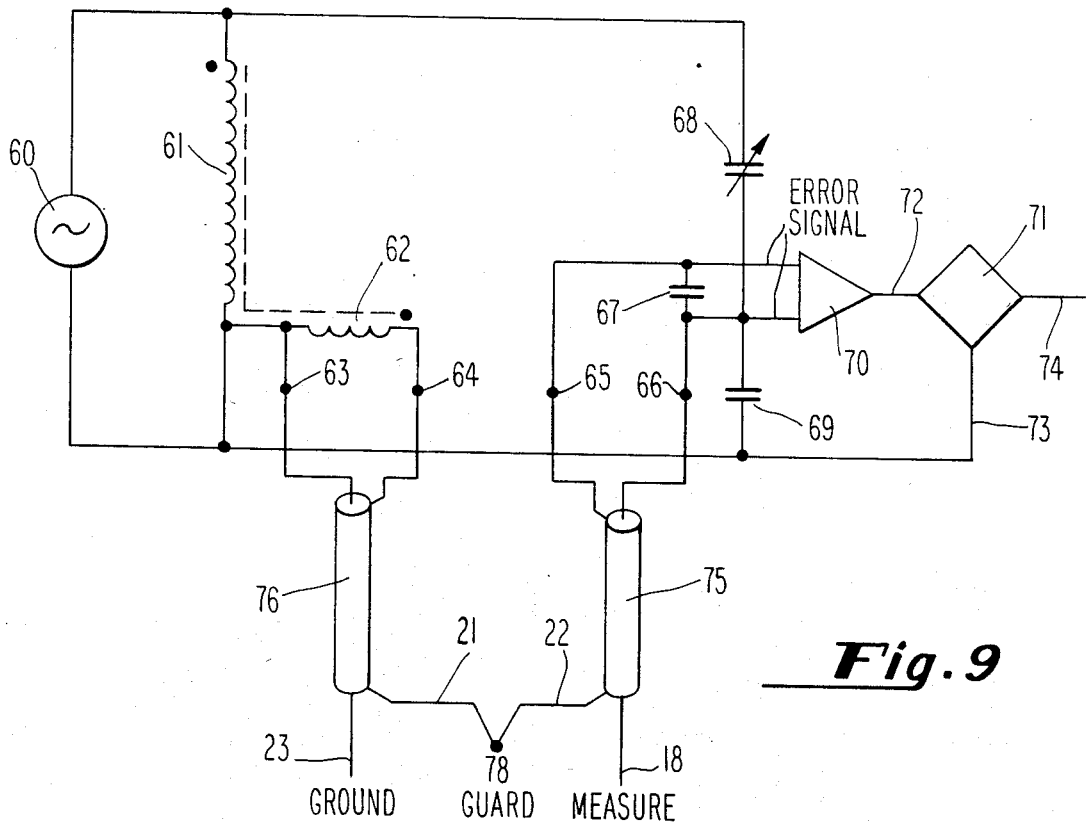
FIG. 9 is a schematic of admittance-responsive circuitry and means of connecting it with the probe.

FIG. 9 shows admittance-responsive circuitry and interconnecting means which are adapted for use with the probe of this invention. An RF oscillator 60 energizes a step-down transformer comprising windings 61 and 62. Winding 62 provides a source of guard potential which is desirably of low voltage, so as to reduce power requirements and low impedance so as to be able to effectively energize the guard electrodes of the probe. A suitably low voltage is 1 volt peak-to-peak which limits the current into a one ohm guard-to-ground resistance to 1 ampere peak-to-peak. The source impedance may be maintained at a low level by using a low output impedance oscillator, a tightly-coupled transformer, and having winding 62 be a single turn of wire which is brought to the guard source terminal 64 and ground terminal 63 as a twisted pair.

In accordance with one important aspect of this invention, the terminals are connected to the remotely mounted probe via a pair of conductors, desirably consisting of a coaxial cable 76. A separate pair of conductors, desirably consisting of a coaxial cable 75, returns the guard potential and the measuring potential to connections 65 and 66 with a bridge measuring circuit. Both guard conductors 21 and 22 are tied together in the probe at 78. Using coaxial cable 76 for the guard source and ground conductors provides a low inductance connection to any guard-to-ground resistance presented by the probe due to a conductive coating, and thus aids in providing a low source impedance at these electrodes. This permits very heavy conductive coatings to be effectively ignored. The use of a separate conductor to return the potential at the guard electrodes to the bridge circuit for use as a bridge reference helps prevent injecting into the admittance meaurement any potential drop which does occur in the guard source and ground conductors. It will be understood that the use of a separate conductor to return the potential at the guard electrodes is advantageous in other types of admittance measuring circuits than RF admittance bridges and with other types of guard sources than transformer windings. For instance, where the guard potential is generated by an amplifier, the returned voltage may be used as feedback to the amplifier to maintain the voltage at the guard electrodes at the proper level.

An RF admittance-measuring bridge circuit comprises a variable capacitor 68, a probe-to-ground capacitance 69, and a capacitor 67. The returned guard voltage present at 65 provides a bridge reference voltage. Variable capacitor 68 provides a means for adjusting the value of probe-to-ground capacitance 69 at which the bridge is balanced. This balanceed condition occurs when the probe measuring voltage at the junction of capacitors 68 and 69 is equal to the bridge reference voltage. When the probe-to-ground capacitance 69 changes from that for which the bridge was balanced, an error voltage appears across the bridge and thus the error signal is indicative of the contents of the probe. The change in error signal with probe-to-ground capacitance is linearized and made substantially independent of the values of capacitances 68 and 69 at which the bridge is balanced by capacitor 67.

Because the resulting error signal is very small, it is amplified to a usable magnitude by high gain error amplifier 70. The output of the error amplifier is applied to the input 72 of a phase-sensitive detector 71 having phase reference 73. Because capacitor 17 forces the probe-to-ground admittance to be primarily capacitive regardless of whether the pipe contains conductive or insulating material, the phase-sensitive detector 71 may be phased to detect primarily capacitance, and the phasing need not be accurate, as it would have to be without capacitance 17.

The output 74 of the phase-sensitive detector is a DC signal related to the degree to which the monitored pipe is filled with material. The output 74 may be used to actuate control or output devices when its level exceeds a predetermined threshold.

Figure 10:
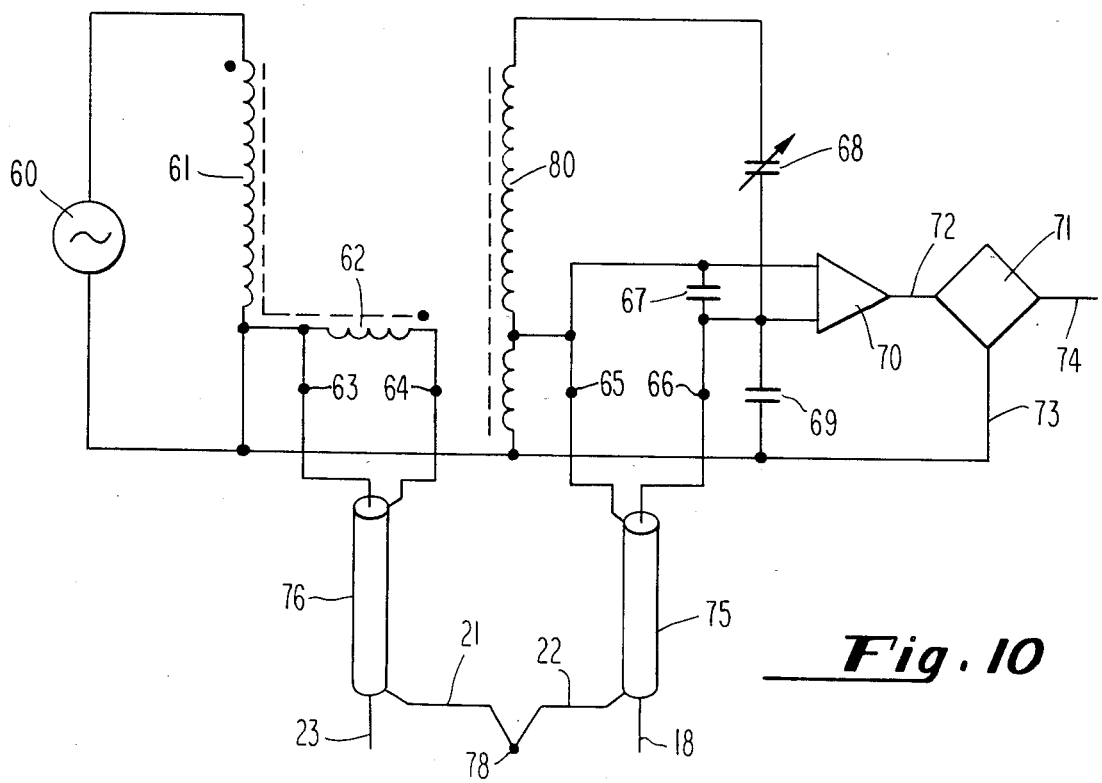
FIG. 10 is a schematic of another version of admittance-responsive circuitry.

An improvement in the circuit of FIG. 9 is shown in FIG. 10. The improvement consists of generating the bridge voltage which energizes the capacitive bridge arm from the returned guard voltage via autotransformer 80. By this method, the bridge balance condition is unaffected by the degree to which the guard electrode voltage is reduced by resistive loading, and more accurate and reliable detection is achieved.

Figure 11:
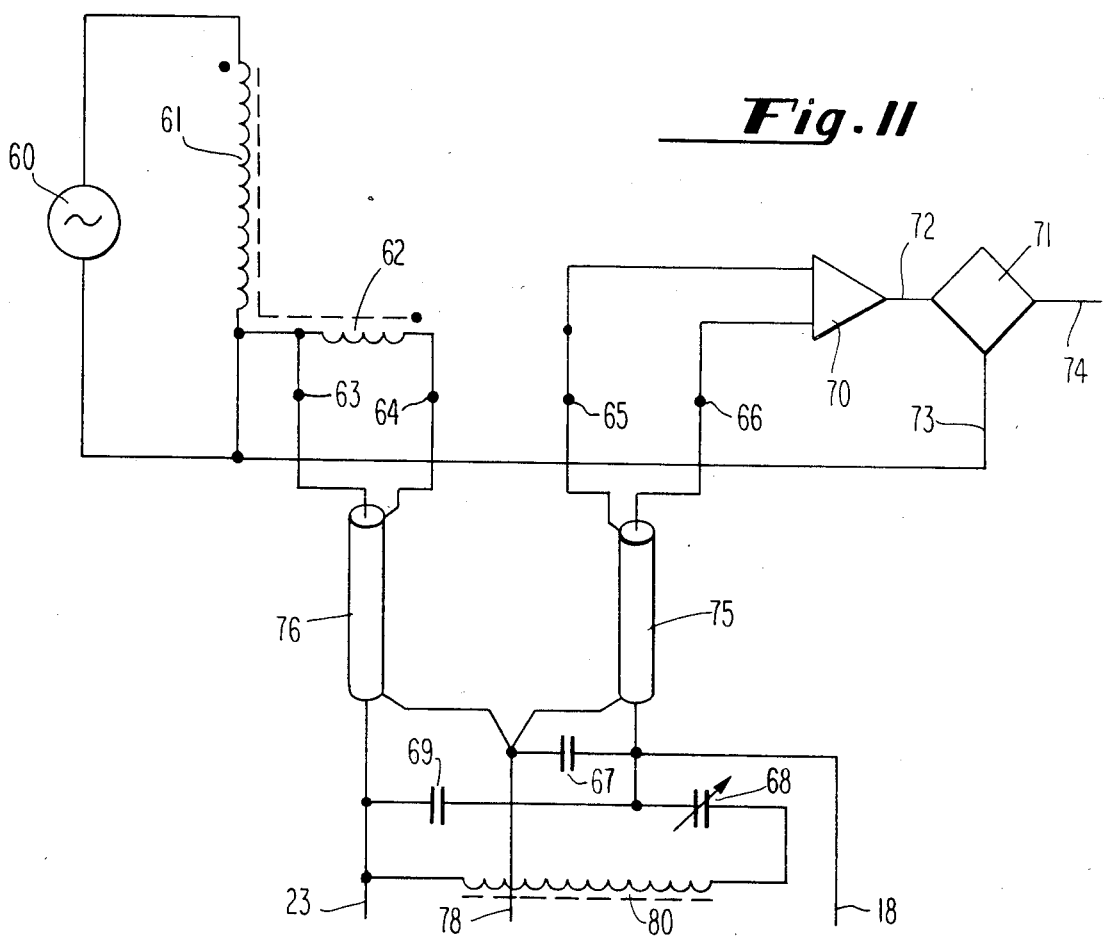
FIG. 11 is a schematic of another version of the admittance responsive circuitry which permits adjusting the empty admittance of any probe to zero.

Another advantage may be achieved by moving the bridge circuit of FIG. 10 to the probe. This is shown in FIG. 11. This permits adjusting the effective empty capacitance of any probe to some standardized value, regardless of probe size. If probes for various pipe sizes are all designed to provide the same change in capacitance upon filling with a given material, which generally may be achieved by scaling the probe dimensions, the measuring circuitry may be pre-calibrated to reliably work with any probe, regardless of pipe size or material electrical characteristics. This also results in convenience of installation and operation since no user adjustment or calibration is required. The same result may be achieved solely by scaling the probe dimensions, but this method does not permit the probes for each pipe size to be optimized for coating tolerance and sensitivity.

Although a particular admittance responsive detector has been shown and described, it will be appreciated that others may be utilized such as the variable frequency and ramp-type detectors shown in U.S. Pat. No. 4,146,834 which is incorporated herein by reference.

Although specific embodiments of the invention have been shown and described, it will be understood that various modifications may be made without departing from the true spirit and scope of the invention as set forth in the appended claims.

We claim:

1. A probe responsive to the degree to which the pipe is filled with a dielectric or conductive material and adapted for mounting between a pair of sections of the pipe and passing said material therethrough between said pair of pipe sections comprising:

tubular conductive probe measuring electrode means having a hollow interior adapted for forming part of a material passageway through said probe between said pipe sections;

a first pair of tubular solid insulation means each axially displaced from said probe measuring electrode means on either side of said probe measuring electrode means for electrically insulating said either side of the probe measuring electrode means and having a hollow interior adapted for forming part of the material passageway through the probe between said pipe sections;

a pair of tubular conductive guard electrode means each outwardly axially displaced from said probe measuring electrode means on either side of said probe measuring electrode means separated from said probe measuring electrode means by one of said pair of first solid insulation means and having a hollow interior adapted for exposure to said material of said pipe and for forming part of said material passageway through said probe;

a pair of tubular conductive ground electrode means adapted for grounding and each outwardly axially displaced from said probe measuring electrode means on either side of said probe measuring electrode means between one of said pair of guard electrode means and a section of pipe proximal the one guard electrode means;

a second pair of tubular solid insulation means each outwardly axially displaced from said probe measuring electrode means on either side of said probe measuring electrode means between one of said pair of guard electrode means and a section of pipe proximal the one guard electrode means and within one of said pair of ground electrode means and adapted for electrically insulating said pair of ground electrode means from said pair of guard electrode means and said material and further having a hollow interior adapted for forming part of said material passageway.

first conductor means having a first end coupled to said probe measuring electrode means and a second end adapted for supplying an AC measuring potential to said probe measuring electrode means;

second conductor means having a first end coupled to at least one of said pair of guard electrode means and a second end adapted for suppying a separate AC guard potential to said guard electrode means; and capacitance means in series with said first conductor means, said probe measuring electrode means and said material in said probe and having an admittance which is large compared to the admittance of the probe measuring electrode means expected when said probe is filled with an insulating material of relatively low dielectric constant, and small when compared to said admittance expected when said probe is filled with conductive material of high conductivity.

2. The probe of claim 1 including a third guard electrode means outwardly radially displaced from and insulated from said probe measuring electrode means.

3. The probe of claim 1 wherein said capacitance means comprises solid insulation means interposed between said probe measuring electrode means and said material in said pipe.

4. The probe of claim 1 wherein said capacitance means comprises a capacitor connected between said second end of said first conductor means and said probe measuring electrode means.

5. A system for measuring the degree to which a pipe is filled with fluid comprising:

tubular conductive probe measuring electrode means located between sections of said pipe and having a hollow interior adapted for passing said fluid between said pipe sections;

a first pair of tubular solid insulation means each axially displaced from said probe measuring electrode means on either side of said probe measuring electrode means adapted for insulating said either side of said probe measuring electrode means and having a hollow interior adapted for passing said fluid betwen said sections and through said probe measuring electrode means;

a pair of electrically coupled tubular conductive guard electrode means each outwardly axially displaced on either side of said probe measuring electrode means separated from said probe measuring electrode means by a different one of said first pair of solid insulation means and having a hollow interior exposed to the contents of said pipe and adpated for passing said fluid therethrough between said pipe sections and through said first pair of solid insulation means and said measuring electrode means;

a pair of conductive ground electrode means each outwardly axially displaced on either side of said probe measuring electrode means between a different one of said pair of guard electrode means and one of said pipe sections proximal the one guard electrode means;

a second pair of solid insulation means each axially outwardly displaced on either side of said probe measuring electrode means between a different one of said pair of guard electrode means and the one pipe section proximal said one guard electrode means and extending through a different one of said pair of ground electrode means and adapted for insulating said pair of ground electrode means from said pair of guard electrode means and said fluid, and having a hollow interior adapted for passing said fluid therethrough between said pipe sections and through said pair of guard electrode means, said first pair of insulation means and said measuring electrode means;

first conductor means adapted to supply a source of AC measuring potential to said probe measuring electrode means;

second conductor means adapted to supply a source of AC guard potential to said pair of guard electrode means substantially equal to said AC measuring potential;

a source of AC measuring potential connected to said first conductor means; and a source of said AC guard potential connected to said second conductor means and adapted to maintain the potential of said pair of guard electrode means substantially at said AC measuring potential.

6. The system of claim 5 wherein said source of AC measuring potential includes an RF admittance bridge.

7. The system of claim 6 wherein said RF admittance bridge includes a step-up transformer and further comprising a third conductor means connected to said guard electrodes means and said transformer for energizing said transformer.

8. The system of claim 7 wherein said RF admittance bridge is located proximal to said probe measuring electrode means, first pair of tubular solid insulation means and pair of guard electrode means and wherein said system further comprises:
    error signal generating means responsive to an output from said RF admittance bridge remotely positioned from said RF admittance bridge with said source of AC guard potential.

9. The system of claim 5 wherein a reference voltage of the RF admittance bridge is provided by a third conductor means connected to said guard electrode means.

10. The system of claim 9 wherein said first conductor means and said second conductor means each comprises a separate conductor of a different coaxial cable.

11. The system of claim 10 wherein the remaining conductor of the coaxial cable containing said second conductor means is grounded and the remaining conductor of the other coaxial cable containing said first conductor means couples said guard electrode means with said RF admittance bridge.

* * * * *